United States Patent
Zatman et al.

(10) Patent No.: US 10,310,066 B1
(45) Date of Patent: Jun. 4, 2019

(54) INDIRECT PASSIVE RADAR DETECTION METHOD AND SYSTEM

(71) Applicants: Michael Zatman, Silver Spring, MD (US); Max Scharrenbroich, Alexandria, VA (US); Jason Eicke, Herndon, VA (US)

(72) Inventors: Michael Zatman, Silver Spring, MD (US); Max Scharrenbroich, Alexandria, VA (US); Jason Eicke, Herndon, VA (US)

(73) Assignee: SAZE TECHNOLOGIES, LLC, Silver Spring, MD (US)

( * ) Notice: Subject to any disclaimer, the term of this patent is extended or adjusted under 35 U.S.C. 154(b) by 628 days.

(21) Appl. No.: 14/985,554

(22) Filed: Dec. 31, 2015

Related U.S. Application Data

(60) Provisional application No. 62/166,384, filed on May 26, 2015.

(51) Int. Cl.
*G01S 3/46* (2006.01)
*G01S 13/46* (2006.01)
*G01S 13/00* (2006.01)

(52) U.S. Cl.
CPC ............ *G01S 13/46* (2013.01); *G01S 13/003* (2013.01)

(58) Field of Classification Search
CPC . G01S 5/02; G01S 5/12; G01S 5/0252; G01S 13/46; G01S 13/003; G01S 13/878
USPC .......................................................... 342/453
See application file for complete search history.

(56) References Cited

U.S. PATENT DOCUMENTS

| | | | |
|---|---|---|---|
| 2008/0042897 A1* | 2/2008 | Ghaleb | G01S 13/003 342/354 |
| 2010/0085243 A1* | 4/2010 | De Gramont | G01S 7/352 342/175 |
| 2015/0378004 A1* | 12/2015 | Wilson-Langman | G01S 7/003 342/52 |

* cited by examiner

*Primary Examiner* — Harry K Liu
(74) *Attorney, Agent, or Firm* — Ascentage Patent Law, LLC; Travis Lee Johnson

(57) ABSTRACT

An indirect passive radar method and system utilizing information obtained from a non-direct source and reflected signals from an object to be identified to determine information associated with the object to be identified, such as speed, location, shaped, distance and so forth.

16 Claims, 6 Drawing Sheets

INDIRECT PASSIVE RADAR DETECTION METHOD AND SYSTEM

CROSS-REFERENCE TO RELATED APPLICATIONS

This application claims the benefit of U.S. Patent Provisional Application No. 62/166,384 filed on May 26, 2015 herein incorporated by reference in its entirety.

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present embodiments relate generally to Passive Radar Systems and Methods.

2. Description of the Prior Art

Active radar systems are generally comprised of a transmitter and receiver, each connected to an antenna. A signal is sent by the transmitter and received by the receiver where the measured time delay for the signal to travel to the object and back is converted into a distance and the measured frequency shift due to the Doppler effect is converted into a relative velocity.

In contrast, passive radar systems exploit the presence of third-party transmitters, such as radio transmitters, television transmitters, other radar transmitters and so forth, instead of using their own transmitter. Conventional passive radar systems require the use of multiple receivers and antennas. The first receiver—herewith denoted as a reference receiver—is connected to an antenna which is directed towards each third-party transmitter or group of transmitters in order to receive high quality copies of the transmitted signals. An additional receiver—herein denoted as the target receiver—is connected to an antenna directed towards the target(s). A passive radar system is able to detect the presence of targets by comparing the signals received from the reference and target receivers and measuring the time and frequency differences between the direct path signals from the third-party transmitter and the signal from the third-party transmitter that is/are reflected off of the target. This allows the bi-static range and bi-static Doppler shift of the target to be determined (see FIG. 1).

In some embodiments, multiple third-party transmitters are used by the passive radar and multiple reflected signals are received by one or more receivers to detect targets and determine their distance, shape, speed and location (see FIG. 2).

This results in two significant limitations for conventional passive radar systems. First is the requirement for both target and reference receivers. The second is that a passive radar's reference receivers must be able to obtain a high-quality copy of the third party transmitter(s') signals, thus limiting the siting and coverage of passive radar systems, both in terms of distance from the third party transmitters and the topography or interfering objects that lie between the transmitters and the reference receivers. The proposed application seeks to address these and other limitations of current passive radar systems.

SUMMARY OF THE INVENTION

Disclosed is a system and method for an indirect passive radar system which does not require the use of reference receivers for obtaining copies of the third-party transmitter's signal. The information contained within the third-party transmitter's signal is obtained through an alternative means such as through the internet, cable feed, satellite downlink or other source. After obtaining the signal information, the signal information is used to form an ideal copy of the third-party transmitter's signal (a process herein referred to as re-modulation). The ideal copy of the third-party's transmitter signal is compared with the signal observed on the target receiver to detect the target and measure the time and frequency differences between the re-modulated signals from the third-party transmitter and the signal from the third-party transmitter that is reflected off of the target. This allows the bi-static range and bi-static Doppler shift of the object to be determined.

In some embodiments, multiple third-party transmitters are used by the indirect passive radar system by obtaining the information contained within the signals through the internet, cable feed, satellite downlink or other source, and multiple reflected signals are received by one or more receivers in order to detect targets and determine their distance, shape, speed and location.

DETAILED DESCRIPTION OF THE PREFERRED EMBODIMENTS

Aspects and embodiments relate generally to the field of determining object or target information using indirect passive radar systems and methods where information related to the signal content of the third-party transmitter can be obtained from a non-direct source such as through the internet, cable feed, satellite communication or the like.

Conventional passive radar systems have a passive radar processor that processes the signal received by the reference receiver to form a filter which is then applied to the signal received from the target receiver in order to detect the presence of a target. The filter formed by the passive radar processor is typically a matched filter, or a matched filter derivative that is optimized to remove interference such as other signals in the environment or ground-clutter.

Passive radar systems typically obtain their location from a map, the Global Positioning System (GPS), or some other geolocation technique. Once their position is known they use a database to determine which local third party transmitters should be used.

Figure 1:
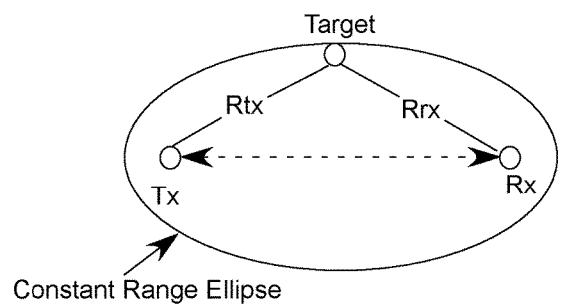
FIG. 1 illustrates a schematic showing bi-static range geometry.

FIG. 1 illustrates a basic bi-static radar geometry schematic that shows the transmitter and receiver being separated by a distance and using geometry to determine the location of the target or object. Bi-static radar equations and geometry have been developed since the 1930's.

Figure 2:
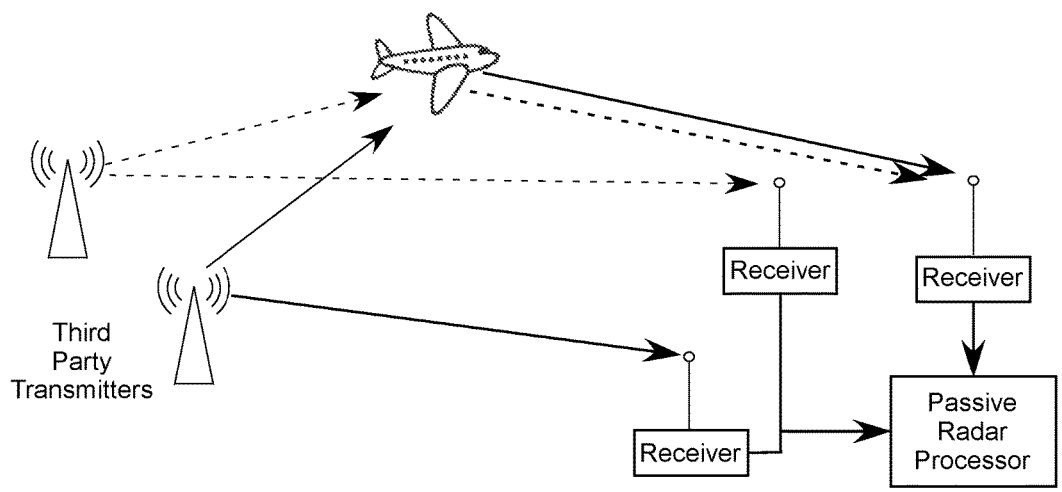
FIG. 2 illustrates a schematic utilizing a conventional or direct passive radar system that can determine location information of a target from third-party transmitters that are directly viewable over the air by a receiver.

FIG. 2 illustrates a basic schematic of a conventional passive radar system, showing multiple third-party transmitters that have their respective signals reflected off the target or object (an airplane as shown) being received by the target receiver while the reference receivers collect the third-party transmitter signals directly. The passive radar processor then compares the reference receiver signals with the target receiver signals to detect the target and determine speed, location, direction, shape and the like.

Figure 3:
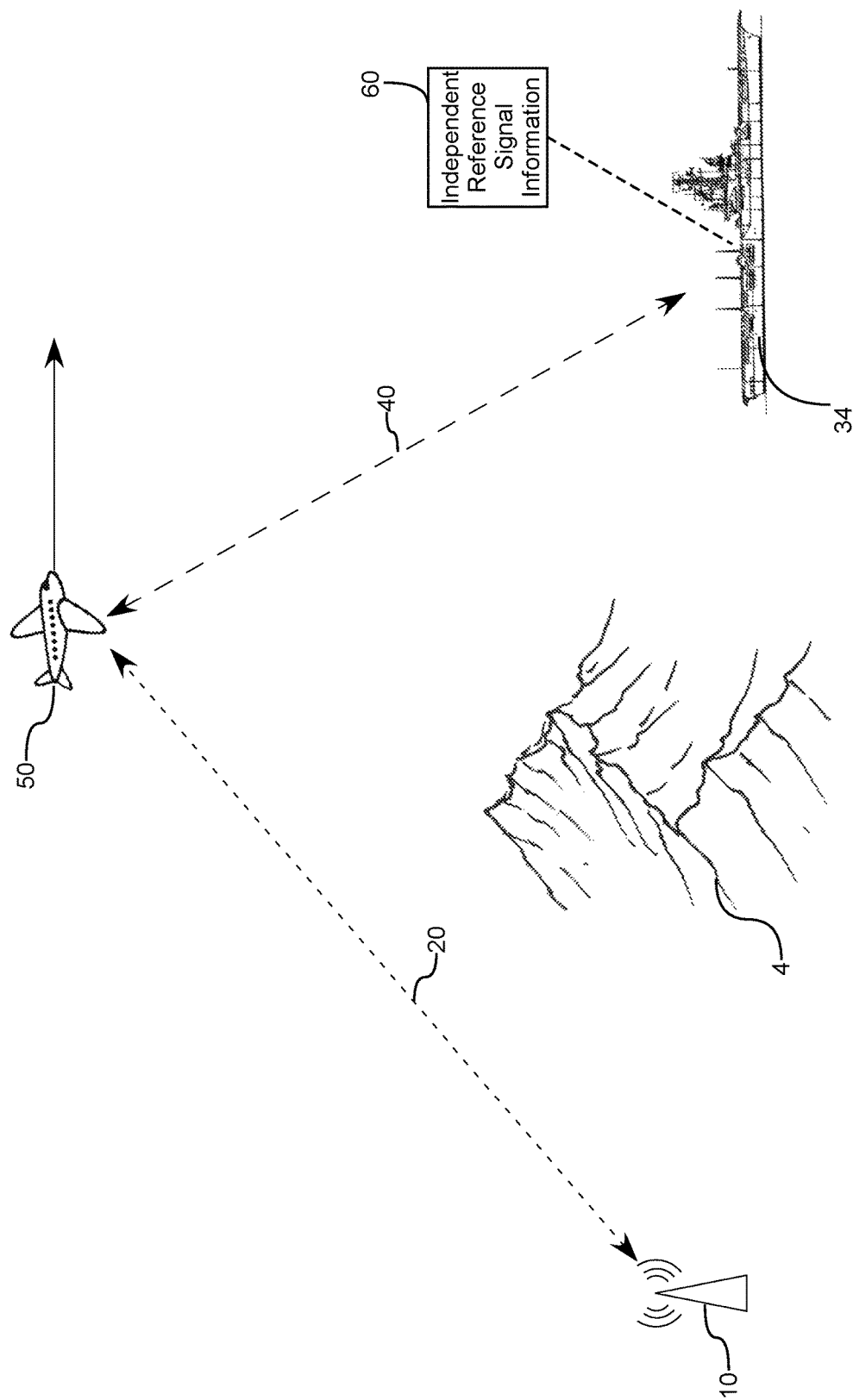
FIG. 3 is an example of a schematic using an indirect passive radar system in accordance with various aspects of the present invention having a passive receiver and a mobile target.

FIG. 3 illustrates a basic schematic of an indirect passive radar system, where the receiver 34 does not have a direct over-the-air line of sight with the third-party transmitter 10. A transmitted signal 20 is emitted from the third-party transmitter 10, which is reflected off a mobile target 50 as reflected signal 40. Reflected signal 40 is then received by the passive receiver 34. The passive receiver shown in these figures are shown mounted on a military ship, but could be placed on or be a part of any building, vehicle, backpack, or other indirect passive system that is mobile or stationary. The indirect radar processor unit connected to the passive receiver also receives reference information contained in the third-parties' transmitter signals through a non-direct source 60 such as the internet, cable television feed or satellite downlink, and the like. The indirect passive radar processor unit then re-modulates the third-party reference signal content received from the non-direct source 60 into the format of the third party transmitter signal (20,40) and compares the re-modulated signal with the reflected signal 40 to detect a target and determine its determine speed, location, direction, shape and the like.

The Indirect Passive Radar Processor is used to generate one or more filters from the information in the third party's reference signal content received by the non-direct source 60 which are applied to the signal received by the passive receiver 34 in order to detect the presence of a target 50. The Indirect Passive Radar Processor applies an extra step of processing when compared to a conventional Passive Radar Processor. The information about the third party's transmitted signal obtained through the internet, cable television feed, satellite downlink or other source will be at a different frequency and may have a different format compared to the signal 20 transmitted over the air that illuminates the target 50. Thus, the Indirect Passive Radar Processor must take the reference signal information obtained from the non-direct source 60, (the internet, cable television feed, satellite downlink or other source) re-modulate it to the format used in the over-the-air transmission 20 and shift to an appropriate frequency prior to forming and applying the filter(s) to the signal 40 received by the passive receiver 34 in order to detect the presence of a target 50 and determine speed, location, direction, shape and the like.

Public sources such as tvfool.com and antennapoint.com along with many other database sources, provide physical locations of public transmitters, frequencies, and other detailed information that can used to determine the physical location of the third-party transmitters, channels, networks, call signs, and frequency they are transmitting at to aid with determining where to find the reference signal content. Once that is identified a filter can be generated to identify the specific received over-the-air transmitted signal from the specific third-party transmitter 10 with its location. For example, if the indirect passive radar system has access to a cable feed for a local Boston NBC TV broadcast, the system can utilize public sources to identify the location and frequency of the local NBC TV broadcast signal; re-modulate the NBC signal content to be used as a filter for the over-the-air NBC transmitted signal and use this filtered signal to detect moving targets, such as airplanes, and determine their direction, speed, location, shape, and so forth using the bi-static radar and Doppler effect equations.

Figure 4:
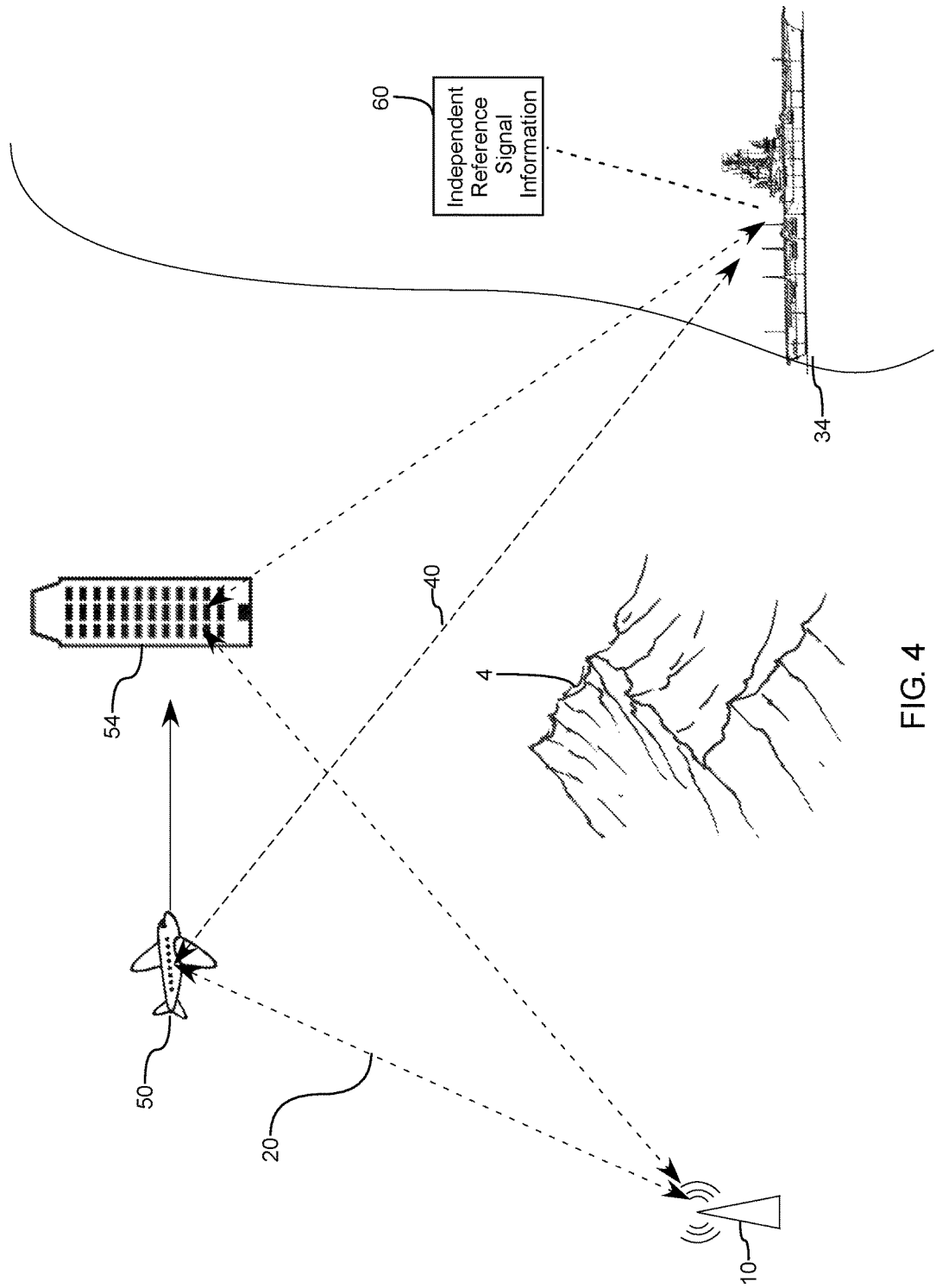
FIG. 4 is another example of a schematic using an indirect passive radar system in accordance with various aspects of the present invention having a passive receiver, a mobile target and stationary target.

FIG. 4 illustrates a similar schematic to that of FIG. 3, but includes receiving a reflected signal from a stationary object 54. Reference signal information is still received from a third-party. The indirect passive radar system can be utilized to identify both moving and non-moving targets as shown in FIG. 4.

Figure 5:
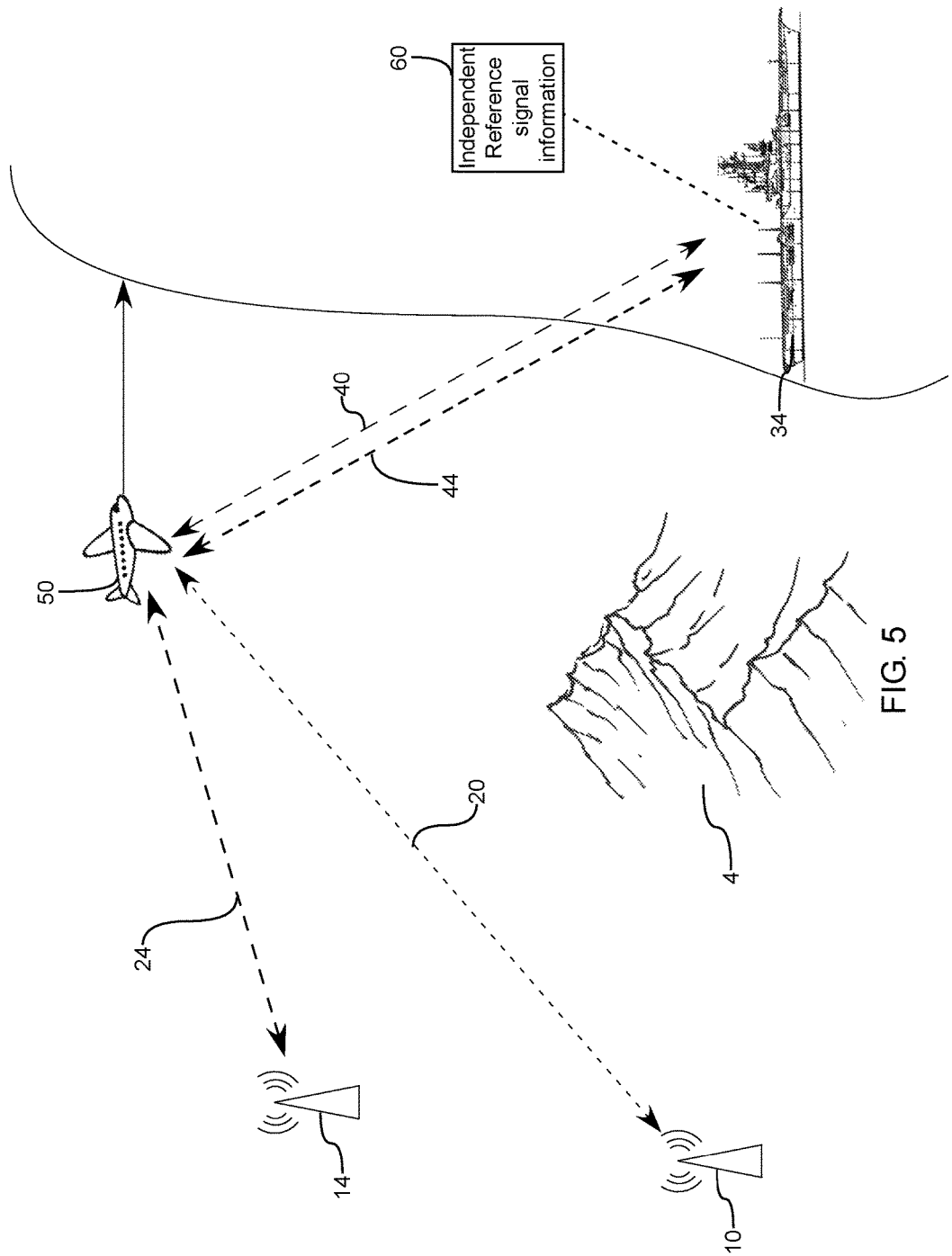
FIG. 5 is an example of using an indirect passive radar system in accordance with various aspects of the present invention where a passive receiver receives reflected signals from multiple third-party sources reflecting from the same mobile target.

FIG. 5 illustrates a similar schematic to FIG. 3, with the utilization of additional third-party transmitters. A second third-party transmitter 14 is shown emitting an over-the-air signal 24 that is reflected from the target 50, wherein the reflected signal 44 is received by the receiver 34. An additional filter can be generated from receiving reference signal information from the non-direct source 60, re-modulating that signal to create the filter to utilize the over-the-air signals emanating from 14 as well as 10. In some embodiments a single antenna 34 can accomplish this, while in other embodiments a second receiver antenna 34 can be employed. The additional information can help further refine information regarding the target 50 including speed, direction, shape, and so forth. The filter formed by the indirect passive radar processor may be a matched filter, or a matched filter derivative that is optimized to remove interference, such as other signals in the environment or ground-clutter.

Figure 6:
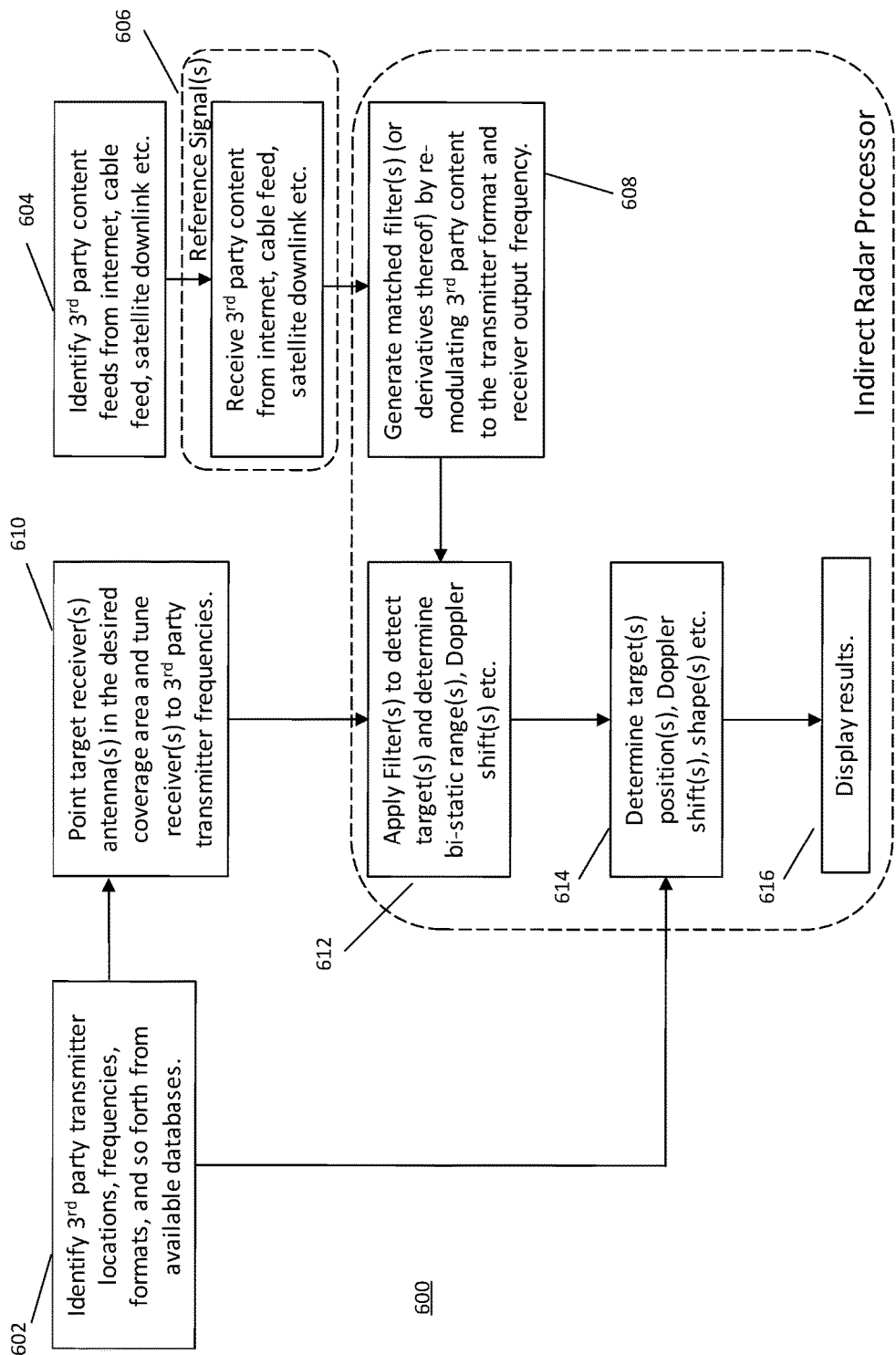
FIG. 6 is a flowchart illustrating a method of using an indirect passive radar system.

FIG. 6 illustrates a flow chart illustrating a method 600 of using an indirect passive radar system as described herein. As mentioned, utilization of databases 602, which include information regarding local transmitters' location, network affiliate, frequency, channel, call sign, strength, and so forth can be obtained from public databases. Once a transmitter information is identified the user can then identify a corresponding non-direct source 604 to use to receive a reference signal 606. The user can receive the reference signal 606 from the non-direct source 604. The indirect radar processor can then be used to generate a filter 608 from the reference signal 606 and transmitter database 602 by re-modulating the reference signal 606. The user can point or direct a target receiver 610 at a target to receive a reflected signal 612 from the third-party over-the-air transmission. The over-the-air reflected signal that is illuminating the target is detected 612 by applying the filter(s) 608 and the bi-static range and Doppler of the target estimated. This information can be compared 614 with the 3rd party transmitter's location by means of the bistatic range and Doppler equations to determine the target's position, shape, speed, location and so forth. The indirect radar processor can then display and/or otherwise report the results 616.

Figure 7:
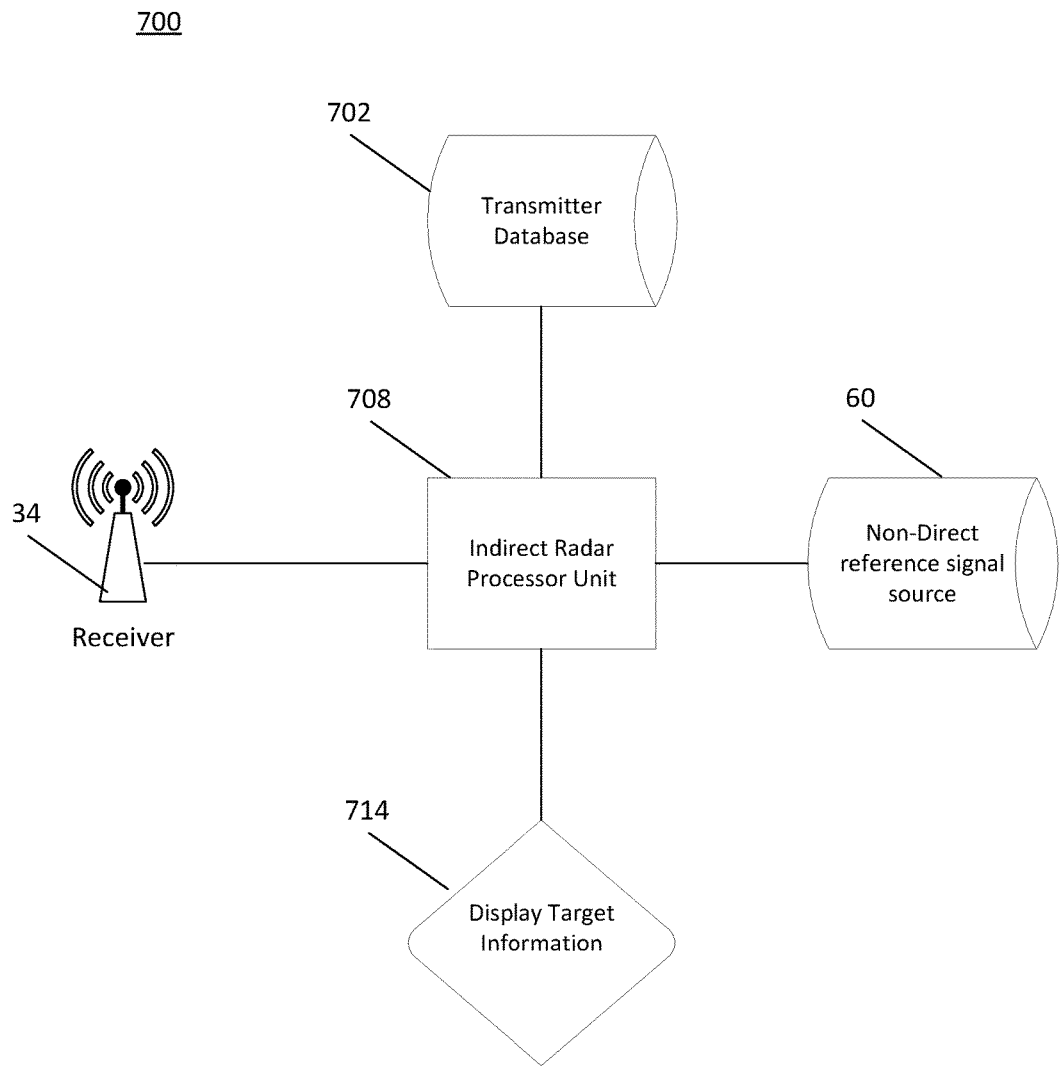
FIG. 7 is an indirect passive radar system.

FIG. 7 illustrates a basic schematic of an indirect passive radar system 700 that includes a processor 708 that is connected to or receives information from a transmitter database 702, which provides third-party transmitter information as described above. The processor 708 also receives reference signal information from a non-direct reference signal source 60, wherein said reference information is used to create a filter for receiving the corresponding over-the-air transmission signal that is received by a receiver 34 that relays the over-the-air transmission information to the processor unit 708. The processor unit can then output the target information to a display or other output device 714, such as a monitor, speaker, and so forth.

The information about the third party's transmitted signal obtained through the internet, cable feed, such as television, satellite downlink or other source will usually be at a different frequency and can have a different format to the signal transmitted over the air that illuminates the target. Thus, the Indirect Passive Radar Processor must take the signal information obtained through the internet, cable television feed, satellite downlink or other source, re-modulate it to the format used in the over-the-air transmission and shift to an appropriate frequency prior to forming the filter and applying the filter to the signal received from the target receiver in order to detect the presence of a target and determine speed, location, direction, shape and the like.

By comparing the transmitted signal with the reflected over-the-air transmission being received from the target object the time delay may be used to determine the relative bi-static range between the transmitter, target and receiver and the frequency shift may be used to determine a relative velocity between the target and the point of receipt. In such a case, if the locations and velocities of the receivers and transmitters are known, the position and velocity of the target can then be determined.

A database may be used to determine the transmitter locations for the over-the-air signals and which transmissions should be used. This signal origin location can be utilized in determining the position, speed, and direction of the target based upon the measured time delays and Doppler shifts. It will be appreciated that the time delays and Doppler shifts from multiple transmitters may be used. By increasing the number of signals and corresponding points of origin for which this calculation is performed, the direction and velocity may be estimated with better accuracy.

It will be appreciated that the Doppler equation for calculating relative speed of an object is:

$$F_O = F_S/(1 - V_s/C)$$

Where, $F_O$ is the observed frequency, $F_S$ is the emitted frequency, C is the velocity of the original transmission medium, i.e. radio waves, $V_s$ is the relative velocity of the target with respect to the transmitter and receiver.

The above description is merely illustrative. Having thus described several aspects of at least one embodiment of this invention including the preferred embodiments, it is to be appreciated that various alterations, modifications, application to different types of radar system and improvements will readily occur to those skilled in the art. Such alterations, modifications, application to different types of radar system and improvements are intended to be part of this disclosure, and are intended to be within the spirit and scope of the invention. It will be further appreciated that any of the above described features and principles can be applied in any number of suitable combinations and configurations. Accordingly, the foregoing description and drawings are by way of illustration and example only.

We claim:

1. An indirect passive radar method comprising the steps:
providing a receiver, having a passive radar processor operatively connected thereto;
receiving, at the receiver, a reflected signal from a target object using a receiver at a receiving location that does not have a direct over-the-air line of sight position with a transmitter emitting an original signal transmission, the reflected signal resulting from the original signal transmission being emitted from the transmitter that is subsequently reflected from the target object;
accessing and obtaining reference signal information about the original signal transmission from an alternative means other than by a direct over-the-air transmission or connection from the transmitter to the receiver;
comparing the reflected signal to the reference signal information;
calculating, utilizing the passive radar processor, at least one of the following: a range, location, speed, shape or other property of the target object based in part on the comparison of the reflected signal to the reference signal information.

2. The method of claim 1, wherein the alternative means includes utilizing any of the following: internet, cable tv feed, satellite downlink.

3. The method of claim 1, wherein the target is stationary.

4. The method of claim 1, wherein the target is a moving object.

5. The method of claim 4, wherein characteristics regarding the target's motion are determined locally and wherein the location or speed calculation is based in part on the target's motion.

6. The method of claim 1, wherein the receiver includes a plurality of antennae.

7. The method of claim 1, further comprising receiving multiple reflected signals from multiple targets.

8. The method of claim 7, further comprising receiving multiple reference signals correlating to each of the multiple reflected signals.

9. The method of claim 1, further comprising placing the receiver on a movable platform.

10. The method of claim 1, wherein the reference signal information is re-modulated to create a filter and the filter is used on the received reflected signal.

11. The method of claim 1, wherein the alternative means includes a database containing receive reference signal information relating to the original signal transmission.

12. The method of claim 1, wherein the reference signal is re-modulated prior to comparing the reference signal to the received reflected signal.

13. The method of claim 1, wherein the steps are applied to any of the following: all types of radar systems or radar-like systems including: ground, sea/water, air or space-based, or ionosondes that perform any of the following types of radar functionality including: search, track, moving target indicator, imaging, synthetic aperture, target identification, or weather radar.

14. An indirect passive radar system comprising:
a receiver having at least one antenna positioned only to receive a reflected transmission, the reflected transmission having been originally omitted in an original form from a third-party transmitter, wherein the reflected transmission represents a variant of the original form which has been reflected of off a target object thus forming the reflected transmission;

a transmission database containing reference signal information relating to the original form of the reflected transmission, the transmission database being provided separately from the emitter and the receiver;

a processing unit, the processing unit being operatively connected to the receiver, the processing unit being configured to receive, indirectly from the third-party transmitter, information from the transmission database and reference signal information relating to the original form of the reflected transmission as contained in the transmission database; and wherein the processing unit uses the transmission database and reference signal information to generate a filter that is applied to the reflected transmission from the target object.

15. The indirect passive radar system of claim 14, wherein the processing unit calculates one of the following: speed, direction or shape of the target object by comparing the reflected transmission and the reference signal information; and wherein the processing unit sends the calculated information to an output device.

16. An indirect passive radar method comprising the steps:

providing a receiver, having a passive radar processor operatively connected thereto;

receiving, at the receiver, a reflected signal being reflected off a target object using a receiver at a receiving location, an original signal transmission being emitted from a transmitter, reflected off the target, thus resulting in the reflected signal;

accessing a transmission database containing reference signal information relating to the original form of the reflected signal, the transmission database being provided separately from the emitter and the receiver;

obtaining reference signal information from the transmission database, the reference signal information being obtained indirectly from the third-party transmitter, the reference signal information comprising information regarding the original form of the reflected signal;

comparing the reflected signal to the reference signal information;

calculating, utilizing the passive radar processor, at least one of the following: a range, location, speed, shape or other property of the target based in part on the comparison of the reflected signal to the reference signal information.

* * * * *